3,249,487
SAFETY LAMINATES
Francis T. Buckley, Hampden, and Joseph S. Nelson, Longmeadow, Mass., assignor to Monsanto Company, a corporation of Delaware
No Drawing. Filed Oct. 23, 1963, Ser. No. 318,194
6 Claims. (Cl. 161—199)

The present invention relates to safety glass laminates and methods for preparing them. More particularly, this invention relates to safety glass laminates having higher penetration resistance to impacting objects.

Present day safety glass laminates generally comprise two or more glass panels with a plastic transparent layer interposed between each of the glass panels. The interlayer conventionally used is composed of a plasticized polyvinyl acetal resin and is generally extruded or formed in thicknesses of 0.015 inch and greater. When these laminates are struck by a blunt object, the plastic interlayer permits the laminate to yield with little or no danger of flying glass. The most important application for laminates of this type are as windshields for automobiles, military vehicles, aircraft, etc. When as a result of a sudden stop, accident, etc., the head or other part of the human body comes into forceful contact with the windshield, the capability of the laminate to yield will prevent skull fracture and the tendency towards concussion. Unfortunately, if the force of impact is too great, penetration of the laminate will occur which can cause an individual to be subjected to severe lacerations and cutting. Consequently, means are continuously being sought to improve the existing safety glass laminates, particularly in terms of penetration resistance.

It has been found that some improvement in penetration resistance may be obtained if the moisture content of the polyvinyl acetal interlayer is increased. Unfortunately, when the moisture content is increased to a level where the improvement in penetration resistance becomes significant, the appearance of bubbles within the interlayer or at the area of interlayer contact with the glass becomes a problem during the laminating stage or during the life of the laminate. Consequently, the automotive and laminating industries have not been able to take significant advantage of this method of improving penetration resistance.

Accordingly, it is the principal object of this invention to provide safety glass laminates having improved physical properties.

Another object of this invention is to provide safety glass laminates having improved penetration resistance to impacting objects and improved safety performance.

Another object of this invention is to provide methods and means to accomplish the preceding objects.

Other objects of his invention will be obvious and will in part appear hereinafter.

These and other objects are attained in a laminated structure comprising two or more glass panels having interposed between the various panels a plasticized polyvinyl acetal interlayer; said interlayer having a moisture content of at least 0.1% by weight and containing sufficient constituent selected from the group consisting of salts, bases, and mixtures of salts and bases of magnesium to produce an Alkalinity Titer having a minimum level inversely proportional to the moisture content and in excess of 50. The Alkalinity Titer is an arbitrary standard based on the alkalinity of the polyvinyl acetal resin. The alkalinity of the plasticized polyvinyl acetal is determined prior to plasticization by dissolving seven grams of the polyvinyl acetal resin in 250 cc. of preneutralized ethyl alcohol and titrating with 0.005 normal hydrochloric acid to a neutral end point using bromphenol blue indicator. The Alkalinity Titer as computed from the results of this titration is the number of milliliters of 0.01 normal hydrochloric acid required to neutralize 100 grams of polyvinyl acetal resin.

The alkalinity level of the plasticized polyvinyl butyral interlayers which are conventionally employed in the glass laminating industry is obtained by the use of sodium or potassium salts and/or bases during the preparation of the polyvinyl butyral resin. As far as is known, magnesium salts and/or bases have never been used during the commercial preparation of the plasticized polyvinyl butyral interlayers. In a copending application, it is pointed out that improved laminates can be produced by increasing the alkalinity level of the interlayer by the increased use of potassium salts and/or bases. It was felt at first that an increased use of magnesium salts and bases might produce similar improvements. Improvements were obtained as illustrated by the following examples but the proportions of magnesium salts and bases necessary to effect improvements differ so significantly from the proportions of potassium salts and bases necessary to effect the same degree of improvement, that it is felt that these two metallic compounds could not be equated. Furthermore, as indicated by Example X, the increased use of some metallic salts and bases appear to produce little or no effective improvement. Another important distinction of the magnesium compounds from the potassium compounds is that the magnesium compounds appear to be less sensitive to moisture variations. With the difficulties encountered, particularly during lamination in maintaining uniform moisture levels, the reduced sensitivity of the magnesium compounds to moisture variations is a decided advantage.

The following examples are given to illustrate the invention and are not intended as limitations thereof. Unless otherwise specified, quantities are mentioned on a weight basis.

EXAMPLE I

A set of ten glass laminates are prepared. The laminates are individually prepared by interposing a specially prepared 0.015 inch thick plasticized polyvinyl butyral resin sheet or interlayer between two 24 x 36 x 0.0125 inch plates of glass. The resulting laminates are then subjected to temperatures of 275° F. at pressures of 185 p.s.i for approximately 10 minutes to bond the laminate or panels together.

These laminates are control laminates employing as the interlayer, a plasticized polyvinyl butyral resin sheet (plasticizer content=29% based on the weight of the plasticized polyvinyl butyral resin) having a moisture content of about 0.4% and an Alkalinity Titer of 20. The Alkalinity Titer level and moisture content of the interlayers used to prepare the control liminates are within the normal or conventional range for polyvinyl butyral interlayers currently used in the safety glass laminating industry. In addition, the alkalinity level of the interlayers utilized in this Example I is produced by the use of potassium acetate during preparation and after neutralization of the polyvinyl butyral resin (see method of resin manufacture below). In contrast, the alkalinity levels for th interlayers utilized for the test laminates prepared in the examples below resulted from the use of magnesium salts and bases during preparation of the polyvinyl butyral resin.

The laminates prepared by the above procedure are then subjected to "Mean Break Height" tests according to the recently established tentative specifications set up by the Society of Automotive Engineers, the Subcommittee on Automotive Glazing and the results tabulated in Table I.

In essence, the "Mean Break Height" test comprises placing the laminate in a horizontal position within a frame or edge support and while maintaining a laminate temperature of 70° F., allowing a 22 pound spherical ball to drop from a designated height against approximately the middle of the laminate. This test is repeated at increasing ball-drop heights to determine the approximate height in feet at which 50% of the laminates tested will resist penetration. In other words, the "Mean Break Height" of a laminate is a measure of the ability of that laminate to absorb the energy of an impacting object.

EXAMPLE II

A set of ten glass laminates are prepared individually by interposing a 0.015 inch thick plasticized polyvinyl butyral resin sheet or interlayer (plasticizer content=29% based on the weight of the plasticized polyvinyl butyral resin) having a moisture content of about 0.4% and an Alkalinity Titer of 100 between two 24 x 36 x 0.0125 inch plates of glass. This Alkalinity Titer is considerably above that normally encountered in the safety glass industry.

The resulting assemblies are then laminated at a temperature of approximately 275° F. under a pressure of about 185 p.s.i. for approximately ten minutes. These laminates are then subjected to "Mean Break Height" tests described above.

EXAMPLE III

A set of ten glass laminates are prepared according to the procedure of Example II except that the plasticized polyvinyl butyral interlayer has an Alkalinity Titer of 60 instead of 100. The results of the "Mean Break Height" tests are tabulated in Table I.

EXAMPLE IV

A set of three glass laminates are prepared according to the procedure of Example II except that the plasticized polyvinyl butyral interlayer has an Alkalinity Titer of 80 instead of 100 and a moisture content of about 0.2% by weight instead of about 0.4%. The results of the "Mean Break Height" tests are tabulated in Table I.

EXAMPLE V

A set of ten glass laminates are prepared according to the procedure of Example IV except that the plasticized polyvinyl butyral interlayer has a moisture content of about 0.4% instead of about 0.2%. The results of the "Mean Break Height" tests are tabulated in Table I.

EXAMPLE VI

A set of ten glass laminates are prepared according to the procedure of Example IV except that the plasticized polyvinyl butyral interlayer has a moisture content of about 0.6% instead of about 0.2%. The results of the "Mean Break Height" tests are tabulated in Table I.

*Table I.—"Mean Break Height" test results*

[0.015 Inch thick interlayers (Examples I–VI)]

| Example | Percent Moisture Content (Approximately) | Alkalinity Titer | "Mean Break Height" (Feet) |
|---|---|---|---|
| I | 0.4 | 20 | 2.3 |
| II | 0.4 | 100 | 6.5 |
| III | 0.4 | 60 | 2.8 |
| IV | 0.2 | 80 | 3.0 |
| V | 0.4 | 80 | 5.0 |
| VI | 0.6 | 80 | 5.0 |

It should be readily apparent that the laminates which employ the higher alkaline polyvinyl butyral interlayers have substantially better penetration resistance. In fact, the particular test results shown in Table I indicate substantial improvements are possible when the alkalinity of the polyvinyl butyral is increased. Furthermore, it should be noted that the moisture content of the interlayers also has an important effect on the penetration resistance of the laminates.

As previously indicated, the polyvinyl butyral interlayers currently used in industry have moisture contents generally varying anywhere from 0.1 to 0.7% with alkalinities ranging between 18 to 25. In order to obtain any appreciable improvement in penetration resistance by increasing the moisture content alone, it is necessary to exceed the 0.7% level. Unfortunately, above 0.7% moisture contents, bubbles which appear during the lamination stage or during the life of the laminate begin to present a problem and this problem becomes severe above 1% moisture content. Consequently, the glass laminating industry has not been able to take appreciable advantage of this method of improving penetration resistance. However, it may be seen in Table I that by increasing the Alkalinity Titer of the interlayer by the increased use of magnesium salts or bases during resin manufacture, it is possible to maintain the moisture content of the polyvinyl butyral interlayer within its normal and substantially bubble-free range while gaining substantial improvement in penetration resistance of the final laminate.

EXAMPLE VII

A set of ten glass laminates are prepared according to the procedure of Example II except that the thickness of the plasticized polyvinyl butyral interlayers which are used to prepare the laminates is 0.030 inch instead of 0.015 inch. The results of the "Mean Break Height" tests are tabulated in Table II.

EXAMPLE VIII

A set of ten glass laminates are prepared according to the procedure of Example V except that the thickness of the plasticized polyvinyl butyral interlayers which are used to prepare the laminates is 0.030 inch instead of 0.015 inch. The results of the "Mean Break Height" tests are tabulated in Table II.

EXAMPLE IX

A set of ten glass laminates are prepared according to the procedure of Example III except that the thickness of the plasticized polyvinyl butyral interlayers which are used to prepare the laminates is 0.030 inch instead of 0.015 inch. The results of the "Mean Break Height" tests are tabulated in Table II.

*Table II.—"Mean Break Height" test results*

[0.030 Inch thick interlayers (Examples VII–IX)]

| Example | Percent Moisture Content (Approximately) | Alkalinity Titer | "Mean Break Height" (Feet) |
|---|---|---|---|
| VII | 0.4 | 100 | 18.0 |
| VIII | 0.4 | 80 | 14.0 |
| IX | 0.4 | 60 | 5.0 |

It is readily apparent by a comparison of Tables I and II that an increase in thickness of the plasticized polyvinyl butyral interlayer will also substantially improve the penetration resistance of the laminates. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts against stationary objects even where the automobile was travelling at speeds in excess of 20 m.p.h. In other words, at normal interlayer moisture contents, if the alkalinity level is increased in accordance with the practice of this invention, a far superior safety laminate will result.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is preferred that the moisture content be maintained rather low. On the other hand, the Alkalinity Titer of the polyvinyl butyral interlayer can be readily increased by the increased addition of magnesium salts and bases during the preparation of the polyvinyl butyral resin. The minimum quantity of magnesium salts and bases necessary to effect a particular improvement in penetration resistance of the final laminate has been found to be inversely proportional to the moisture content. As a guideline for approximating the minimum Alkalinity Titer necessary to effect a significant improvement in penetration resistance of the laminate for any particular moisture content level, a straight line equation is herein presented as follows:

$$y = -44m + 110$$

wherein $m$ represents the moisture content of the plasticized polyvinyl butyral interlayer and $y$ the approximate minimum Alkalinity Titer necessary to effect a significant improvement in the penetration resistance of the final laminate. It is not intended to convey the impression that the minimum Alkalinity Titer necessary to effect a significant improvement in penetration resistance is precisely defined by this straight line function. However, if the Alkalinity Titer level is maintained above the minimum described by this equation for any particular moisture content, significant improvements in penetration resistance will be obtained. A further limitation is set forth in that the minimum Alkalinity Titer level should be in excess of 50. At levels lower than 50, the moisture content must be increased to an undesirable or bubble problem range thereby tending to cause visual defects in the final laminate.

The minimum Alkalinity Titer levels approximately described by this equation are peculiarly applicable to Alkalinity Titer levels which resulted from the use of magnesium salts and bases during resin manufacture. The results are not the same when other metal salts or bases are used. Some metallic salts such as potassium appear to perform better in some respects while others appear to perform poorly or not at all. The reduced sensitivity in terms of penetration resistance, of interlayers whose alkalinities were obtained through the use of magnesium salts and bases, is a definite advantage however. Example X illustrates the difference or superior advantage between interlayers prepared using magnesium salts and bases and those using the salts or bases of calcium. The "Mean Break Height" test results obtained on laminates using these latter interlayers does not compare favorably even though the Alkalinity Titers are the same.

EXAMPLE X

The procedures of Examples III, V, and II are followed respectively except that the Alkalinity Titer level of the plasticized polyvinyl butyral interlayer in each instance is obtained by the use of calcium salts and bases during manufacture of the polyvinyl butyral resin. The approximate "Mean Break Height" results obtained on these three respective sets of laminates are as follows:

| No. | Percent Moisture Content (Approximately) | Alkalinity Titer | "Mean Break Height" (feet) |
| --- | --- | --- | --- |
| 1 | .4 | 40 | 2.1 |
| 2 | .4 | 60 | 2.3 |
| 3 | .4 | 80 | 2.2 |

In the preparation of the glass safety laminates as described in the preceding examples, the glass and polyvinyl butyral interlayers were maintained as clean as is feasibly possible under carefully controlled conditions. However, it should be pointed out that the presence of lint, dust, atmospheric oils, etc., on the surface of either the glass or interlayer will affect the "Mean Break Height" results. If the glass or plastic is contaminated by these impurities to any great extent, the effect on "Mean Break Height" results can be substantial. Since it is the general intent of the safety glass laminators to produce laminates as contamination-free as possible, the amounts of impurities present in the finished laminates will probably be low in most instances.

In general, the laminates are prepared by interposing the plasticized polyvinyl butyral interlayer between a pair of glass plates and then subjecting the resulting assembly to a temperature of 200 to 325° F. and a pressure of 150 to 225 p.s.i. for at least 10 minutes to bond the assembly together.

The plastic material employed as the interlayer in the practice of this invention is referred to as plasticized polyvinyl butyral. In general, the interlayer thicknesses which are used to laminate glass for safety glass use are in excess of 0.010 inch. The laminates conventionally used for windshields of automobiles are generally about 0.015 inch thick. However, laminates have been prepared for various applications where the interlayer thickness varied anywhere from 0.010 inch up to 0.065 inch. A laminate particularly suitable for windshield application, which would not be penetrated by a human head upon collision impacts of a vehicle against stationary objects at speeds in excess of 20 m.p.h., is one where the Alkalinity Titer of the interlayer is in excess of 60 and the thickness of the interlayer is between 0.009 to 0.032 inch with moisture contents within the normal range, i.e., 0.1 to 0.7% by weight.

The Alkalinity Titer of the interlayer is most conveniently adjusted during preparation of the polyvinyl butyral resin. For optimum results when using magnesium compounds, it is generally preferred that magnesium acetate be used to increase the alkalinity of the polyvinyl resin. Magnesium or even potassium hydroxide can be used quite satisfactorily to neutralize the resin when it is on the acid side. In general, the resin is prepared by first polymerizing vinyl acetate and then hydrolyzing the polymerized product. The hydrolyzed product is then reacted with butyraldehyde in ethanol solution in the presence of a suitable quantity of sulfuric acid. The reactions are controlled to produce a polyvinyl butyral aldehyde resin containing approximately 15 to 30% of unreacted hydroxyl calculated at weight percent of vinyl alcohol and about 0 to 3% of ester calculated as weight percent of vinyl acetate; the balance being substantially butyraldehyde acetal dissolved in ethanol. The resulting product may be precipitated from the ethanol by the addition of water followed by repeated water washings until substantially all of the acid is removed. After the acid is substantially removed, suitable quantities of magnesium or potassium hydroxide are added to maintain the suspension alkaline to brom-phenol blue indicator for several hours. Then, suitable quantities of magnesium acetate may be added to produce the desired Alkalinity Titer necessary to significantly improve the penetration resistance of the laminate which is later prepared. The resin is then separated from the suspension medium, washed with water and dried. The quantity of water used to wash the resin is also important for controlling the Alkalinity Titer of the final product. Large quantities of wash water will tend to lower the alkalinity of the polyvinyl butyral resin. It is generally preferable to standardize on the amounts of wash water used regularly the Alkalinity Titer by the quantity of magnesium salts added to the suspension prior to washing and drying the resin. Although this procedure is effective for controlling the alkalinity of the polyvinyl butyral, it is not intended to limit the scope of this invention by the particular method used to prepare the resin, but rather, it is within the scope of this invention to utilize any process or method which will produce a polyvinyl butyral interlayer having the required Alkalinity Titer resulting from the use of magnesium salts and/or bases.

The resin obtained by the above procedure is then plasticized to the extent of about 17 to 32% and more commonly between 29 to 32% by weight for normal windshield use. The resulting plasticized resin mixture is then generally extruded in the form of sheets and cut to size to produce the interlayers used in the present invention. In general, the plasticizers which are commonly employed are esters of a polybasic acid or a polyhydric alcohol. Particularly suitable are triethylene glycol di(2-ethyl butyrate), dibutyl sebacate, and di(beta-butoxyethyl) adipate. The plasticized polyvinyl butyral resin interlayer is self-adhesive in nature thereby eliminating the need for a separate adhesive to bond the glass laminate together.

Safety glass laminates find special application in the automotive and aircraft industries for protecting passengers both against the hazards of flying objects and to reduce injury caused by bodily impact against the laminate. Wherever else glass or transparent panels are utilized such as in the building trade, the protection afforded by safety glass has become increasingly important. The laminates of the present invention increase the advantages of utilizing safety glass because of their improved safety performance.

It is obvious that many variations may be made in the products and processes set forth above without departing from the spirit and scope of this invention.

What is claimed is:

1. In an improved laminated structure comprising at least two glass panels having interposed between the various panels a plasticized polyvinyl acetal interlayer having a moisture content of at least 0.1% by weight, the improvement which comprises incorporating sufficient constituent selected from the group consisting of salts, bases and mixtures of salts and bases of magnesium into the interlayer to produce an Alkalinity Titer having a minimum level inversely proportional to the moisture content and in excess of 50.

2. The improved laminated structure according to claim 1 wherein the polyvinyl acetal is polyvinyl butyral.

3. The improved laminated structure according to claim 2 wherein the constituent used to produce the Alkalinity Titer is magnesium acetate.

4. In an improved plastic interlayer for use in safety laminates composed of a plasticized polyvinyl acetal resin, said interlayer having a moisture content of at least 0.1% by weight, the improvement which comprises incorporating sufficient constituent selected from the group consisting of salts, bases and mixtures of salts and bases of magnesium into the interlayer to produce an Alkalinity Titer having a minimum level inversely proportional to the moisture content and in excess of 50.

5. The improved laminated structure according to claim 4 wherein the polyvinyl acetal is polyvinyl butyral.

6. The improved plastic interlayer according to claim 4 wherein the constituent used to produce the Alkalinity Titer is magnesium acetate.

References Cited by the Examiner

UNITED STATES PATENTS

| | | | |
|---|---|---|---|
| 2,456,462 | 12/1948 | Stamatoff | 260—73 |
| 2,720,501 | 10/1955 | Van Ness | 260—73 |
| 2,859,207 | 11/1958 | Dahle | 260—73 |
| 2,860,122 | 11/1958 | Berardinelli et al. | 260—73 |
| 2,946,711 | 7/1960 | Bragaw et al. | 161—199 |

ALEXANDER WYMAN, *Primary Examiner.*

W. J. VAN BALEN, *Assistant Examiner.*